March 8, 1949.   J. BLOECHER   2,464,114
MEAT HOLDER TO FACILITATE CARVING
Filed Dec. 3, 1945
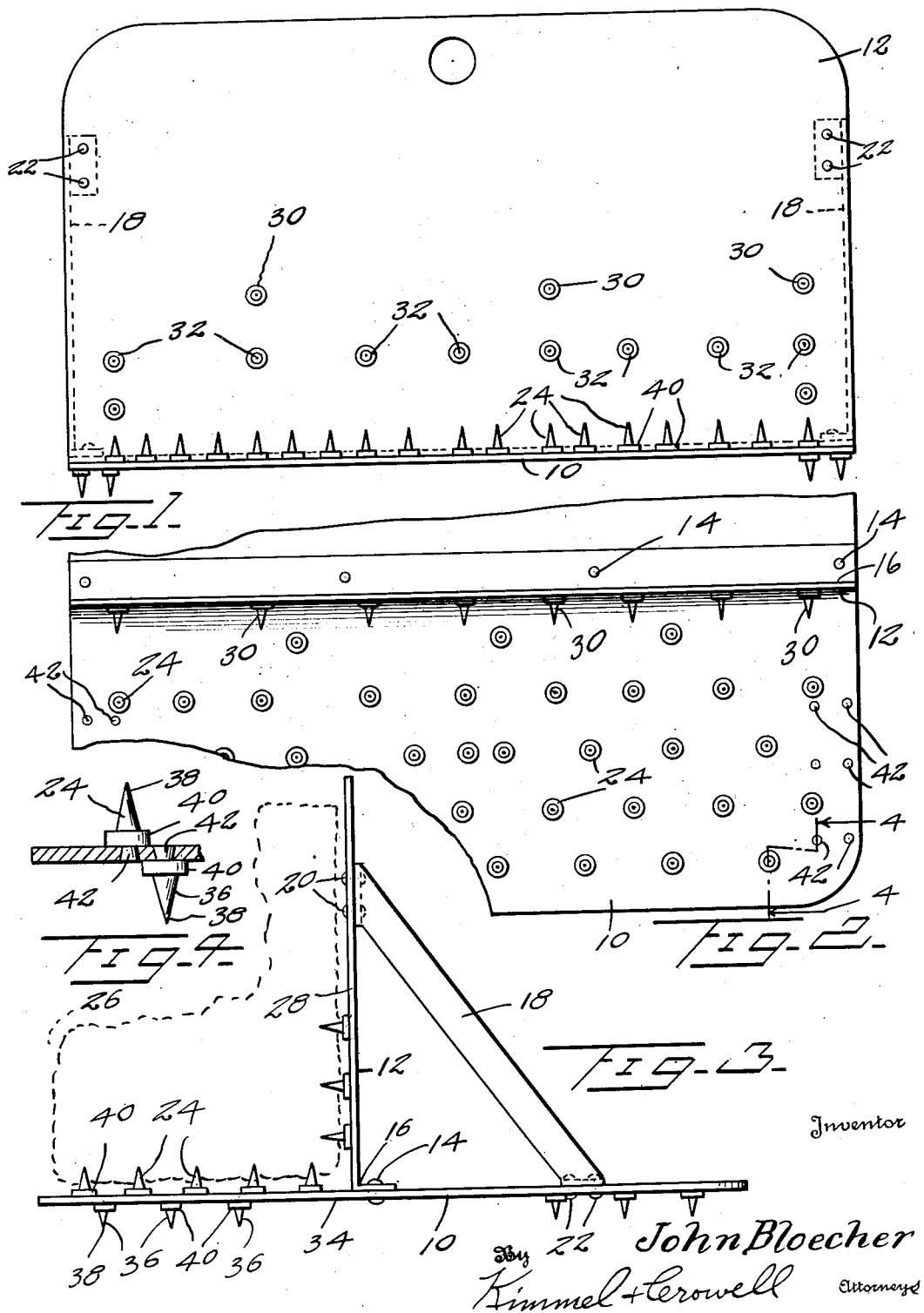
Inventor
John Bloecher
By Kimmel + Crowell
Attorneys Patented Mar. 8, 1949

2,464,114

UNITED STATES PATENT OFFICE 2,464,114

MEAT HOLDER TO FACILITATE CARVING

John Bloecher, Baltimore, Md.

Application December 3, 1945, Serial No. 632,556

2 Claims. (Cl. 146—216)

1

This invention relates to a supporting means and more particularly to a holder for meat.

It is an object of this invention to provide a holder for meat which will hold meat in such a manner as to allow a person to carve the meat to within a very short distance from the end thereof without hinderance from the meat holder.

It is another object of this invention to provide a meat holder on which meat may be quickly put for carving and from which it may be easily removed when desired.

It is another object of this invention to provide a meat and steak holder having means thereon for preventing the holder from sliding across a surface upon which it has been placed during carving operations.

It is another object of this invention to provide a meat holder having means thereon for gripping the meat.

It is another object of this invention to provide a meat holder having meat engaging needles or prongs thereon arranged in such a manner as to permit the adequate holding of bone containing meat.

It is a still further object of this invention to provide a meat holder of strong, durable and simple construction and which may be economically manufactured and marketed.

Other and still further objects of this invention will become apparent from the following description of a preferred embodiment thereof with reference to the accompanying drawings, in which:

Figure 1 is a frontal elevation of the meat holder showing the preferred arrangement of prongs on the side supporting surface thereof for the insertion therebetween the bone containing portions of meat;

Figure 2 is a top plan view of the meat holder showing the staggered relationship of rows of meat holding prongs on the bottom supporting surface thereof;

Figure 3 is a side elevation of the meat holder showing meat held thereon; and

Figure 4 is a detailed view partly in cross section of the bottom supporting surface of the meat holder and showing the method of mounting the prongs thereon.

The invention comprises a bottom support 10 and a side support 12, each preferably constructed of a wide rectangular sheet of metal. The side support 12 may be attached to the bottom support 10 by any suitable means such as the

2 rivets 14 extending through a flange 16 on the lower edge of the side support 12.

The side support 12 may be further secured to the bottom support 10 by means of a brace 18 extending between the side support 12 and the bottom support 10 and secured thereto by any suitable means, such as rivets 20 and 22 extending through the bent end portions of the brace 18.

The bottom support 10 is provided with a series of prongs 24 for gripping a slab of meat 26. The prongs 24 are preferably arranged in parallel rows, the prongs in each row bearing a staggered relationship to the prongs in adjacent rows for purposes of adequately gripping the meat.

The side support 12 may be similarly provided with prongs on the front surface 28 thereof, the prongs of the side support 12 being mounted in rows such that an upper row 30 contains fewer prongs than a lower one of the rows 32, so that a spaced relationship exists between the prongs of the upper row 30 for the insertion between the prongs 30 of bone containing portions of meat, while the boneless portions of the same piece of meat are firmly engaged by the lower row of prongs 32.

The bottom support 10 is further provided with means on the under side thereof with narrowly edged means, such as the prongs 36 for gripping a wooden butcher's table to prevent the meat holder from sliding across the top surface thereof.

The prongs 36 and 24 are of a construction shown in Figure 4 having pointed ends 38 for the easy empaling of the meat thereon, widened base portions or enlargements forming shoulders between their ends 40 engaging the surfaces of the plates from which the prongs extend to prevent their dislocation from the supporting members 10 and 12 and stems 42 forming rivets generally frustro-conical in shape to further prevent their becoming disengaged from the bottom and side supports 10 and 12.

In operation meat may be pushed into the corner between the bottom support 10 and the side support 12 and against the prongs 24 and will be securely held thereby while carving. The prongs 36 will prevent the meat holder from sliding across the top surface of a butcher's table, and the construction of the meat holder is such that whenever desired meat may be easily removed therefrom.

From the above description it will be apparent that this invention has provided a meat holder on which meat may be easily placed and securely held in a manner allowing a carver to slice meat up to within a very small distance from the end thereof.

The above description of the invention is for illustrative purposes only and it is understood that some modifications may be made in the invention within the scope and spirit of the following claims:

What I claim is:

1. A holder for meat comprising a horizontal bottom plate, a vertical side plate mounted medially on and across the bottom plate and secured thereto at its lower edge, inclined braces between said bottom plate and said side plate at the ends thereof spaced from the end of the bottom plate and top of the side plate, and pointed prongs mounted on said bottom plate and said side plate for piercing and holding meat placed thereagainst, the prongs on one row being in staggered relation to the prongs of adjoining rows and the prongs on the side plate being mounted in rows such that an upper one of said rows contains fewer prongs of wider spacing than a lower one of said rows so that the bone portions of the meat may extend between the prongs.

2. A holder for meat comprising a horizontal bottom plate, a vertical side plate mounted medially on and across the bottom plate and secured thereto at its lower edge, inclined braces between said bottom plate and said side plate at the ends thereof spaced from the end of the bottom plate and top of the side plate, and pointed prongs mounted on said bottom plate and said side plate for piercing and holding meat placed thereagainst, the prongs of the horizontal plate being arranged in a plurality of vertical rows and the prongs of the side plate being arranged in a plurality of horizontal rows with the prongs of the lower row located at the ends of the plate only, the prongs of the middle row being arranged in pairs thereabove more widely spaced apart at one end and those of the top row being still more widely spaced apart than those of the middle row but less than the prongs of the lower row to take bone containing portions of the meat therebetween, and pointed prongs projecting straight downwardly from the underside of the horizontal plate near the ends thereof to prevent the holder from sliding on a butcher's block or table.

JOHN BLOECHER.

REFERENCES CITED

The following references are of record in the file of this patent:

UNITED STATES PATENTS

| Number | Name | Date |
|---|---|---|
| 1,149,525 | Kennedy | Aug. 10, 1915 |
| 1,471,122 | Greaves | Oct. 16, 1923 |
| 1,631,827 | Lentagne | June 7, 1927 |
| 1,977,462 | Van Berkel | Oct. 16, 1934 |

FOREIGN PATENTS

| Number | Country | Date |
|---|---|---|
| 6,933 | Great Britain | 1909 |
| 193,617 | Great Britain | Mar. 1, 1923 |